United States Patent [19]
Unno et al.

[11] Patent Number: 5,705,740
[45] Date of Patent: Jan. 6, 1998

[54] METHOD AND APPARATUS FOR MEASURING DYNAMIC IMBALANCE OF SPHERE

[75] Inventors: Tetsuo Unno; Yoshio Shoda, both of Fujiawa, Japan

[73] Assignee: NSK Ltd., Tokyo, Japan

[21] Appl. No.: 585,865

[22] Filed: Jan. 11, 1996

[30] Foreign Application Priority Data

Jan. 13, 1995 [JP] Japan ................................ 7-004295

[51] Int. Cl.$^6$ ........................................ G01M 1/00
[52] U.S. Cl. .............................. 73/65.09; 73/65.07
[58] Field of Search ............................ 73/65.01, 65.02, 73/65.07, 65.09, 460, 461, 462

[56] References Cited

U.S. PATENT DOCUMENTS 4,111,038  9/1978  Olson et al. .......................... 73/65.02
4,233,846  11/1980  Taylor .
4,546,644  10/1985  Beny et al. ........................... 73/65.02
4,688,427  8/1987  Hyland, Jr. ........................... 73/460

FOREIGN PATENT DOCUMENTS 62297740  4/1986  Japan .................................. 73/460

*Primary Examiner*—Ronald L. Biegel
*Attorney, Agent, or Firm*—Helfott and Karas

[57] ABSTRACT

A sphere is supported in a floating condition by a pneumatic bearing so as to be rotated by compressed air sprayed from a nozzle. The sphere has a single point magnetized on its surface, and is placed on its rotating axis. If the sphere has a dynamic imbalance, the single point is subjected to pressesion around its inertia axis, the locus and displacement velocity of which are measured by the Hall elements arranged in an arc line around the pneumatic bearing, thereby obtaining the dynamic imbalance of the share.

8 Claims, 3 Drawing Sheets

METHOD AND APPARATUS FOR MEASURING DYNAMIC IMBALANCE OF SPHERE

FIELD OF THE INVENTION

This invention relates to a measurement method and measurement device for measuring the dynamic imbalance of a sphere, and can be used, for example, in measuring the dynamic imbalance of spheres manufactured from magnetic material such as balls in a ball bearing.

DESCRIPTION OF THE RELATED ART

In order to be able to use a ball bearing for supporting a spindle that rotates at high speed so that there is no uneven wear on the balls, spheres whose dynamic imbalance is small must be used for the bearing balls. Of course, it is best if it does not exist at all. Moreover, in order to manufacture this kind of ball bearing, the dynamic imbalance of the spheres, such as bearing balls, must be measured, so that only the spheres with small dynamic imbalance are produced.

A measurement device for measuring the dynamic imbalance of spheres that are used for this kind of purpose has been previously disclosed in Japanese Patent First Publication KOKAI S62-297740. FIG. 4 shows an example of this formerly known device for measuring the dynamic imbalance of spheres. This measurement device comprises a pneumatic bearing 3. The top portion of this pneumatic bearing 3 is open and its surface 1 has a spherical concave shape, and the inner surface of this spherical, concave surface 1 supports a sphere 2 so that it is capable of rotating freely.

Moreover, at the top of this pneumatic bearing 3 there is a nozzle 4 which is capable of freely spraying compressed air. When performing measurement, compressed air is sprayed from this nozzle 4 onto the sphere 2 supported by the pneumatic bearing 3 so that it rotates. Furthermore, magnetic pick-up coils 5a, 5b and 5c are located so that if a straight line is to project from them, respectively, they would all cross orthogonally at the center of the aforementioned sphere 2 (located on the x, y, and z axes), and the detectors of these magnetic pick-up coils 5a, 5b and 5c are located near the outer surface of the sphere 2.

When measuring the dynamic imbalance of the aforementioned sphere 2, a magnetic spot is attached to the sphere 2 before placing it into the aforementioned spherical, concave surface 1. Then compressed air is supplied from a air-supply conduit 6, so that the sphere 2 floats and it is sprayed with compressed air from the aforementioned nozzle 4. As a result, the sphere 2 rotates around a specified axis of rotation, and if there is any dynamic imbalance of the sphere 2, then precession occurs in this sphere 2. The locus and displacement velocity of this precession is detected by the change in density of magnetic flux using the aforementioned pick-up coils 5a, 5b and 5c. If the locus and displacement velocity of the precession is found from the measured values of the magnetic pick-up coils 5a, 5b and 5c, it is then possible to find the amount of dynamic imbalance $\Delta I$, that is, difference in moment of inertia of the sphere 2, from equation (1) below.

$$\Delta I = \Omega \cdot (I/\omega) \cdot \cos \beta \qquad (1)$$

In equation (1) above, $\omega$ is the angular velocity of gyration of the axis of rotation at a certain instant, and found from the measured values of the magnetic pick-up coils 5a, 5b and 5c. Also, I is the moment of inertia of the sphere 2, and found from actually measuring the sphere 2, specifically its mass and diameter. Moreover, $\omega$ is the angular velocity of the sphere 2, and found from the measured values of the magnetic pick-up coils 5a, 5b and 5c. Furthermore, $\beta$ is the angle between the principal axis of inertia and the axis of rotation, and found from the measured values of the magnetic pick-up coils 5a, 5b, and 5c.

In the former device for measuring the dynamic imbalance of a sphere constructed as described above, there are the following problems (1) and (2).

(1) To detect the precession using the three magnetic pick-up coils 5a, 5b and 5c, it is necessary to distribute a magnetic flux all the way around the surface of the sphere 2, however in the method of using a magnetic spot it is difficult to evenly distribute the magnetic flux around the entire sphere 2. Therefore, it is easy for errors to occur when measuring the density of the magnetic flux, and it is easy for errors to occur in the measurement results of the dynamic imbalance that are based on the results of the measurement of the density of the magnetic flux.

(2) When measuring the precession from the change in density of the magnetic flux, it is very difficult to precisely measure minute changes in density of the magnetic flux using the three magnetic pick-up coils, so that the measurement precision is poor.

SUMMARY OF THE INVENTION

An object of this invention is to provide a method of measurement and the device for measuring dynamic imbalance which solves the aforementioned problems (1) and (2).

Another object of this invention is to provide a method of measuring dynamic imbalance of a sphere made of magnetic material wherein a first point on the sphere is magnetized, the sphere is freely rotatably supported, the sphere is rotated with the point placed on the axis of rotation causing precession due to the dynamic imbalance of the sphere, the locus and displacement velocity of the point due to the precession are measured, and the dynamic imbalance of the sphere is calculated based on the measurement results.

Now, if a second point is magnetized at the opposite pole of the sphere from the first point so that the angle between the second point and the first point is not 180 degrees, it is also possible to calculate the rotational velocity of the sphere by observing the displacement of this second point.

Moreover, another feature of the invention is to provide a method of measuring dynamic imbalance of a sphere made of non-magnetic material, wherein a magnetic material such as magnetic paint, magnetic spot, magnetic foil, magnetic film are attached at one point or several locations for magnetization on the surface of the sphere, the sphere is freely rotatably supported, the sphere is rotated with the point placed on the axis of rotation causing precession due to the dynamic imbalance of the sphere, the locus and displacement velocity of the point due to precession are measured, and the dynamic imbalance of the sphere is calculated based on the measurement results.

Furthermore, another object of the present invention is to provide a measurement device for measuring the dynamic imbalance of a sphere made of magnetic material comprising a pneumatic bearing where the upper portion is open and has a spherical concave surface in which the sphere having a magnetized point on its surface can be supported so that it rotates freely, several magnetic detector elements that are located in an arc shape around the upper open portion of the pneumatic bearing, a nozzle that sprays pressurized air on a portion of the sphere supported in the pneumatic bearing, so that the sphere rotates, and an electrical circuit for obtaining the measurement values necessary for calculating the dynamic imbalance of the sphere based on the output signals of the several magnetic detector elements.

Another object of the present invention is to provide a retaining ring which is attached to the upper edge around the upper open portion of a pneumatic bearing, where the upper portion is open and has a spherical concave surface in which a sphere having a magnetized point on its surface can be supported so that it rotates freely, such that magnetic detector elements comprising Hall elements are arranged in a semi-arc line at equal intervals around the inner peripheral surface of the retaining ring, and that a nozzle faces to the sphere above the Hall element at the circumferentially central position and sprays pressurized air on a portion of the sphere supported in the pneumatic bearing.

BRIEF DESCRIPTION FORM OF THE DRAWINGS

DESCRIPTION OF THE PREFERRED EMBODIMENT

Figure 1:
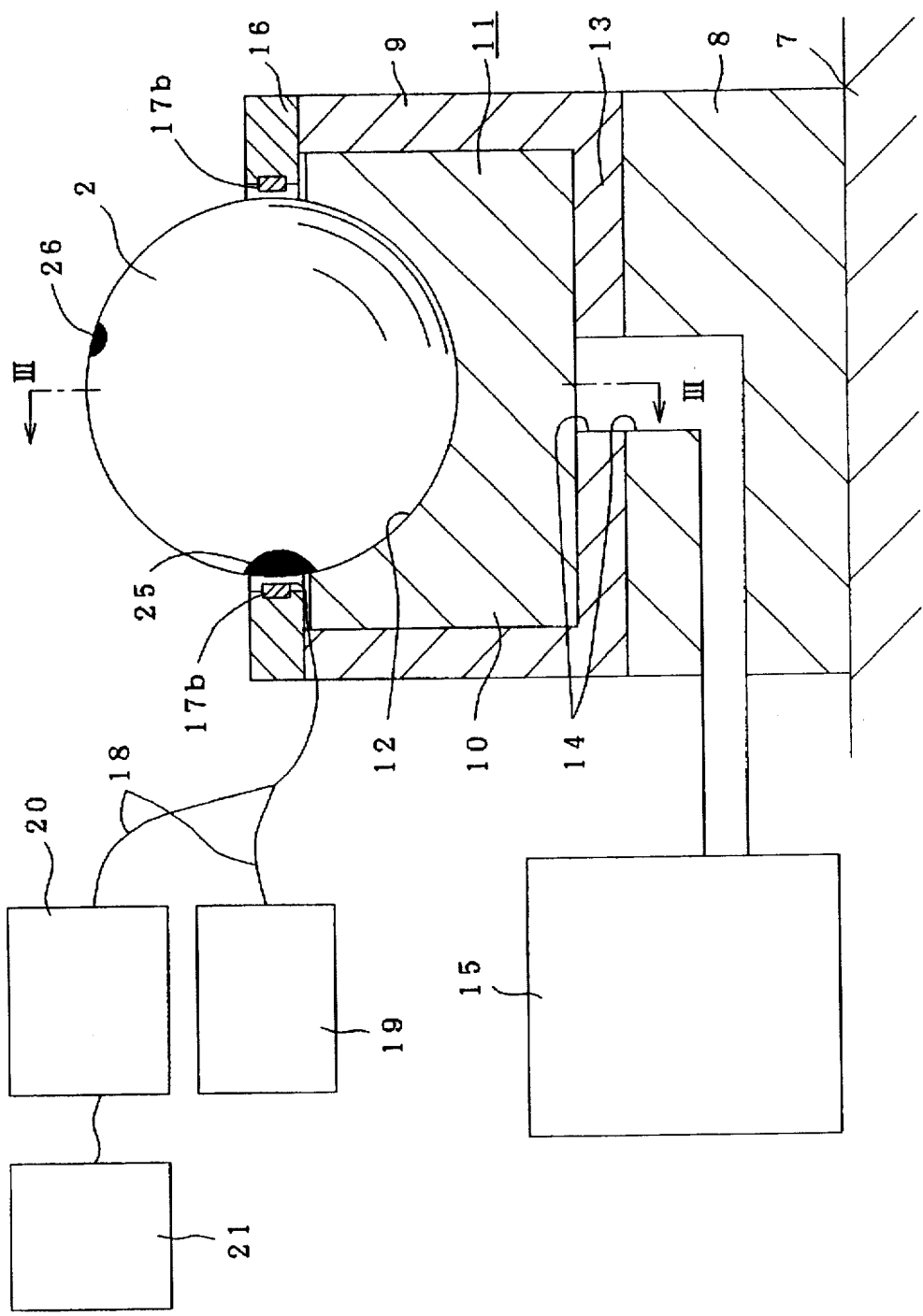
FIG. 1 is a vertical cross sectional view of an embodiment of the measuring apparatus according to the present invention.
Figure 2:
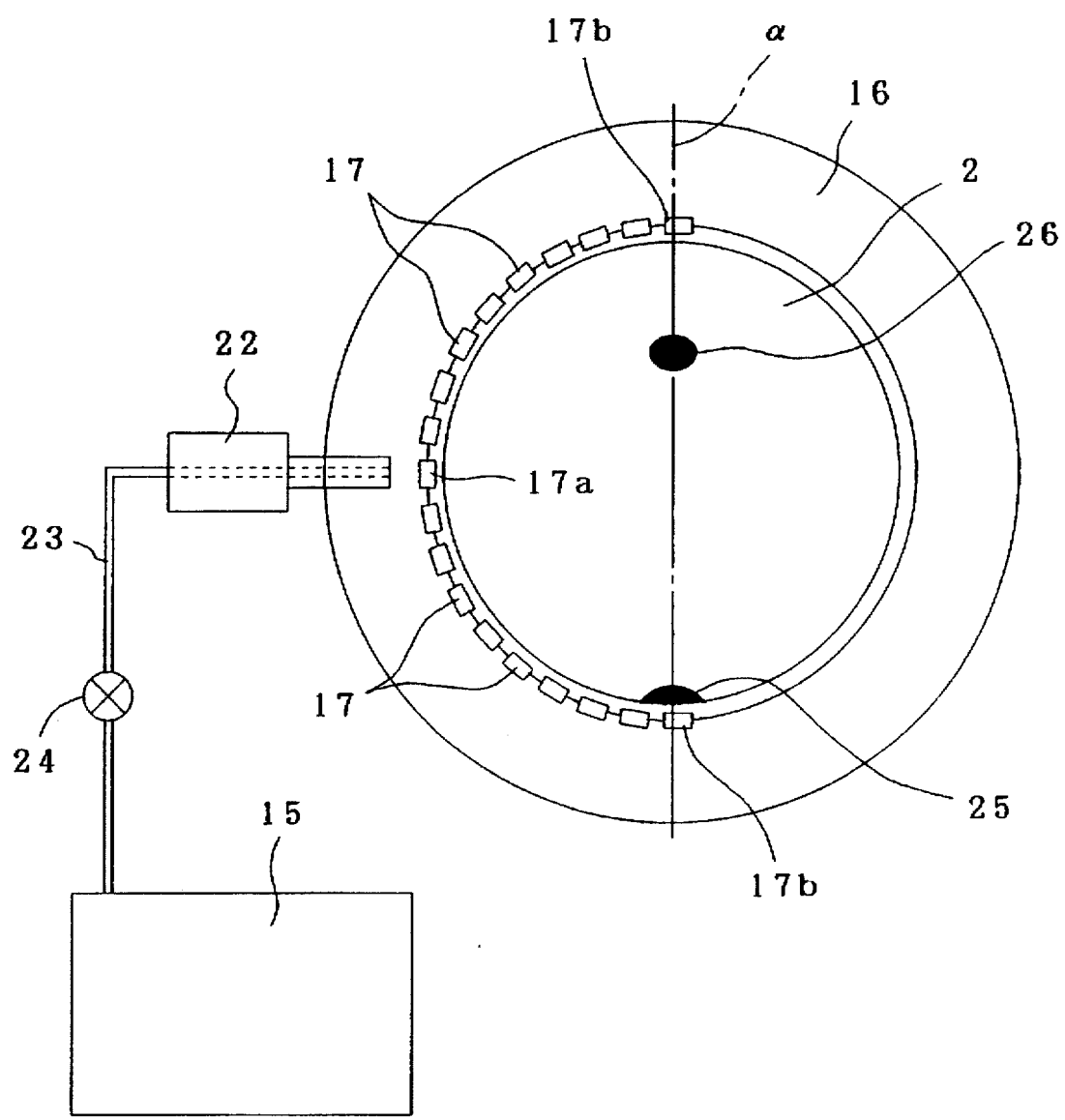
FIG. 2 is a partial plan view of the embodiment of FIG. 1.
Figure 3:
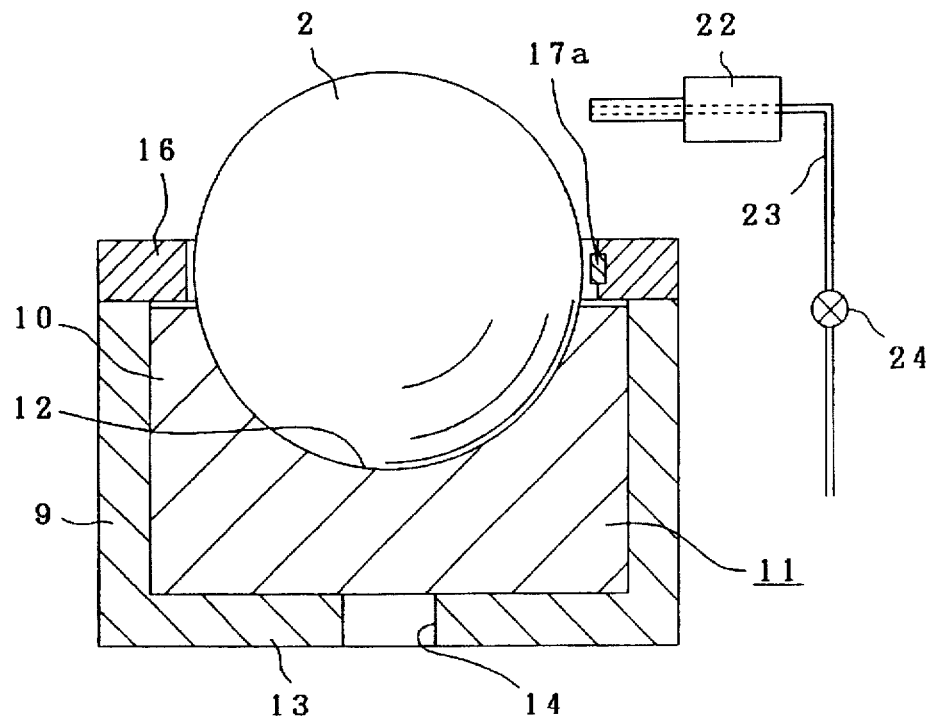
FIG. 3 is a view taken along the line III—III in FIG. 1.
Figure 4:
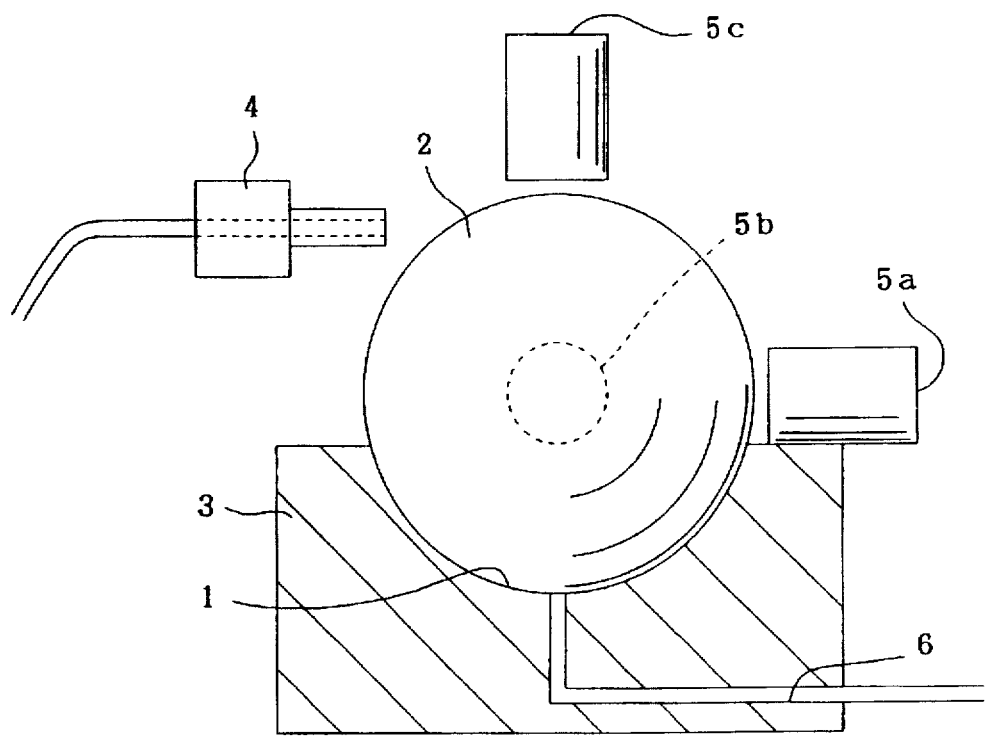
FIG. 4 is a view similar to FIG. 3 showing an example of the prior art measuring apparatus.

FIGS. 1 thru 3 show an embodiment of the measurement device for measuring the dynamic imbalance of a sphere of this invention. There is a seat member 8 that is fastened to the top surface of a base 7 so as to mount a pneumatic bearing 11 therein.

A cylindrical case 9 with a bottom is fastened to the top surface of the seat member 8. The pneumatic bearing 11 is constructed from this case 9 and a porous material 10 that is fitted on the inside of the case 9.

An upwardly open spherical, concave surface 12 is formed on the top surface of this porous material 10. The inner radius of this spherical, concave surface 12 is a little larger than the outer radius of the sphere 2 that is to be measured.

Also, an air-supply hole 14 is formed on the bottom plate 13 of the case 9 and the inside of the seat member 8, and the upstream end of the conduit for this air-supply hole 14 is connected to an air supply device 15 such as a compressor. Compressed air is fed to the inside of the case 9 from this air supply device 15 through the air-supply hole 14, and blown out from the inner surface of the spherical, concave surface 12 causing the sphere 2 to float so that it rotates freely. Thus, the sphere 2 is supported.

There is a circular retaining ring 16 on the top surface of the case 9 that makes up this kind of pneumatic bearing. Also, disposed around half of the inner peripheral surface of this retaining ring 16 are the Hall elements 17, 17a and 17b that are used as the magnetic detector elements. In the embodiment shown in the figure, the nineteen Hall elements 17, 17a and 17b are arranged at equal intervals to be separated by center angle pitch of 10 degrees, forming a semi-circular arc line. The maximum inscribing circle of these Hall elements 17, 17a and 17b arranged in this kind of semi-circular arc has a diameter a little larger than the outside diameter of the sphere 2. Accordingly, these Hall elements 17, 17a and 17b are faced to the outer surface of the sphere 2 through a very small gap, respectively.

Moreover, the detection signals from these Hall elements 17, 17a and 17b are input to a voltmeter 19 and adding circuit 20 through separate lines 18. The total value from this adding circuit 20 is displayed on the display 21. The voltmeter 19 and adding circuit 20 make up the electrical circuit used for obtaining the measured values that are necessary for calculating the dynamic imbalance of the sphere 2 based on the output signals from the Hall elements 17, 17a, and 17b.

Furthermore, in a part of the retaining ring 16, there is a nozzle 22 (FIG. 2) that is located above the Hall element 17a at their circumferentially central position, and used for blowing compressed air. The opening of this nozzle 22 is faced toward the top of the sphere 2. There is a valve 24 located along the air-supply pipe 23 that supplies compressed air to the nozzle 22, and by opening this valve 24, compressed air is blown onto the top of the sphere 2 from the nozzle 22. By blowing compressed air onto the sphere 2 that is supported in the spherical, concave surface 12 of this pneumatic bearing 11, the sphere 2 starts to rotate so that its axis of rotation is parallel to the line α that connects the pair of Hall elements 17b and 17b located on both ends in the circumferential direction of the multiple Hall elements 17, 17a, and 17b.

To measure the dynamic imbalance of the sphere 2 made of magnetic material using the measurement device constructed as described above, a first point 25 is magnetized on the surface of the sphere 2 (for example at the North pole). The size of this magnetized point should be as small as possible so long as it is able to maintain adequate magnetic strength. Also, a second point 26 that is separate from this first point 25 is magnetized on the opposite pole from the first point 25 (for example the South pole) so that the angle between the second point 26 and the first point 25 (the angle of the straight lines connecting both points through the center of the sphere 2) is not 180 degrees.

The bottom half of the sphere 2 is placed into the spherical, concave surface 12 so that the first point 25 is located on the axis of rotation. Compressed air is fed to the case 9 through the air-supply hole 14, so that the sphere 2 floats. In this state, the valve 24 is opened, so that the compressed air is blown from the nozzle 22, and the sphere 2 begins to rotate.

If the sphere 2 has absolutely no dynamic imbalance, then the sphere 2 will just rotate around the axis of rotation and there will be no other motion. However on the other hand, if the sphere 2 does have some dynamic imbalance, precession will occur with respect to the extent of dynamic imbalance. Specifically, the axis of rotation caused by the compressed air blown from the nozzle 22 does not move, however precession of the sphere 2 does occur. As a result of this precession, the point 25 moves away from the axis of rotation, and turns around the principal axis of inertia to return again to the axis of rotation.

The locus and displacement velocity of the point 25 that is based on this kind of precession can be found from the change in the output signal from the Hall elements 17, 17a and 17b. In other words, when the point 25 turns around the principal axis of inertia, the point 25 moves away from the Hall element 17b on the end in the circumferential direction and approaches one of the other Hall elements 17. The locus can then be found from which of the Hall elements 17 the point 25 came close to, and the displacement velocity can be found from the time that it takes to go from the closest Hall element 17 to the next closest Hall element 17 due to the precession. That is, it is possible to find the time difference between one Hall element and a different Hall element to which the point 25 comes closest.

If the locus and the displacement velocity are found in this way, by using the device described above, the amount of dynamic imbalance, $\Delta I$, of the sphere 2 can be found from equation (1) below.

$$\Delta I = \Omega \cdot (I/\omega) \cdot \cos \beta \tag{1}$$

In equation (1), $\omega$ is the angular velocity of gyration of the axis of rotation and can be found from the time it takes for the point 25 to go from the closest Hall element to the next closest Hall element as mentioned above. Also, the moment of inertia, I, of the sphere 2 can be found from actual measurement values of the mass and radius of the sphere 2. Moreover, $\Omega$ is the angular velocity of the sphere 2 around the axis of rotation and can be detected from the output signals from the Hall elements generated by the rotation of the point 25.

However, if the point 25 is facing the Hall element 17b on the end in the circumferential direction, in other words if the point 25 is located on the axis of rotation, the output signals from the Hall elements generated by the rotation of the sphere 2 will not be a pulse wave, and the angular velocity, $\omega$, cannot be found by just observing the output signals from the Hall elements generated by the first point 25. Therefore it can be found from the pulse-wave output signals from the Hall elements 17, 17a that are generated by the passing of the second point 26. Furthermore the angle, $\beta$, between the principal axis of inertia and the axis of rotation can be found from the locus which is based on the measurement values obtained from the Hall elements 17, 17a.

By making the angle between the first point 25 and the second point 26 something other than 180 degrees, if it is impossible to measure the precession when the first point 25 is lined up with the principal axis of inertia, the second point 26 can be used to measure the precession, and the angular velocity, $\omega$, can be found from the first point 25.

If an extremely light magnetic coating or magnetic spot of known mass is attached at one point or several locations to the surface of a sphere made of non-magnetic material and then magnetized, and if the sphere is rotated so that the magnetized points are located at the axis of rotation, it is possible to calculate the imbalance that occurs due to attaching this magnetic coating or magnetic spots, from the attached mass and the angle $\beta$ between the principal axis of inertia and the axis of rotation, and from this it is possible to accurately find the amount of imbalance of the sphere itself.

In the embodiment shown in the figure, the nineteen Hall elements 17, 17a and 17b are arranged at equal intervals so that the center angle pitch is 10 degrees, however if the number of the Hall elements is increased, it is possible to improve the accuracy of detection.

Moreover, even with the nineteen Hall elements, if the sensitivity of all of the Hall elements 17, 17a and 17b is the same, it is possible to improve the accuracy of detection by comparing the strength of the detection signals of adjacent Hall elements 17, 17a and 17b when the point 25 passes between the adjacent Hall elements 17, 17a, and 17b, and thereby determining the position of the point 25.

In either case, with the method of measurement and the measurement device for measuring the dynamic imbalance of a sphere of this invention, when the sphere 2 made of magnetic material is magnetized itself, there is no change in the dynamic imbalance of the sphere 2 due to being magnetized. Moreover, the locus and displacement velocity of the precession of the sphere 2 are obtained by observing the single point 25 which is magnetized, so that the measuring steps are precisely carried out without being affected by the distribution of the magnetic flux density. In other words, the locus and displacement velocity of the precession are obtained by observing the passing of the magnetized point or single point 25, so that the precision in detecting is improved when compared to the method of measuring the continuously changing magnetic flux density.

In the method of measurement and measurement device of this invention for measuring the dynamic imbalance of a sphere constructed as described above, the locus and displacement velocity of the precession of the sphere is found by observing the point that is magnetized on the surface of the sphere without being affected by the distribution of the magnetic flux density, thus the imbalance can be performed accurately. In other words, the locus and displacement velocity of the precession is found by observing the travel of the magnetized point, and this improves accuracy of detection when compared with the method of measuring the continuously changing density of the magnetic flux.

Accordingly the measurement method and measurement device for measuring the dynamic imbalance of a sphere of this invention makes it possible to accurately measure the dynamic imbalance of a sphere. As a result, this invention can make a contribution to the development of high-performance, high-speed rotating devices, where for example, ball bearings that normally rotate even at high speeds are realized.

What is claimed is:

1. A method of measuring a dynamic imbalance of a sphere made of magnetic material, comprising the steps of:
   processing a surface of the sphere such that the surface has a first point magnetized in a pole;
   supporting rotatably the sphere, so that the sphere begins to be rotated with the first point placed on an axis of rotation so as to cause precession due to the dynamic imbalance of the sphere:
   measuring the locus and displacement velocity of the first point due to the precession; and
   calculating the dynamic imbalance of the sphere based on the measurement results of locus and displacement velocity,
   wherein a second point is provided on the surface of the sphere and magnetized at the opposite pole from the first point so that the angle between the second point and the first point is other than 180 degrees, whereby it is possible to calculate the rotational velocity of the sphere by observing the displacement of the second point.

2. The method of claim 1, wherein said plurality of magnetic detector elements are arranged in a semi-circular arc line.

3. The method of claim 1, wherein said magnetic detector elements are arranged in said arc line near to each other.

4. A measurement device for measuring dynamic imbalance of a sphere, comprising:
   a pneumatic bearing having an upper portion open to form a spherical concave surface, in which the sphere having a surface with a magnetized point provided thereon can be rotatably supported;
   a plurality of magnetic detector elements located in an arc line around the upper open portion of the pneumatic bearing to output a signal;

a nozzle for spraying pressurized air on a portion of the sphere rotatably supported in the pneumatic bearing;

an electrical circuit for obtaining the measurement values necessary for calculating the dynamic imbalance of the sphere based on the signal of the magnetic detector elements; and a retaining ring having an inner peripheral surface attached to the upper open portion of the pneumatic bearing, wherein the magnetic detector elements are comprised of a Hall element, respectively, and arranged in said arc line at equal intervals around the inner peripheral surface of the retaining ring, and the nozzle is located to face the sphere above the Hall element at a central position in the arc line.

5. The device of claim 4, wherein said plurality of magnetic detector elements are arranged in a semi-circular arc line.

6. The device of claim 4, wherein said magnetic detector elements are arranged in said arc line near to each other.

7. A method of measuring a dynamic imbalance of a sphere made of magnetic material, comprising the steps of:

processing a surface of the sphere such that the surface has a first point magnetized in a pole;

supporting rotatably the sphere so that the sphere begins to rotate with the first point placed on an axis of rotation;

providing a plurality of magnetic detector elements arranged in an arc line about the sphere such that the magnetic detector elements are different in projected position on the axis of rotation of the sphere;

when precession due to the dynamic imbalance of the sphere is caused, detecting passage of the first point by the magnetic detector elements or between the magnetic detector elements to measure the locus and displacement velocity of the first point due to the precession; and calculating the dynamic imbalance of the sphere based on the measurement results of the locus and displacement velocity;

providing a second point on the surface of the sphere and magnetized at the opposite pole from the first point so that the angle between the second point and the first point is other than 180 degrees, whereby it is possible to calculate the rotational velocity of the sphere by observing the displacement of the second point.

8. A measurement device for measuring dynamic imbalance of a sphere, comprising:

a pneumatic bearing having an upper portion open to form a spherical concave surface in which the sphere, having a surface with a magnetized point provided thereon, can be rotatably supported;

a plurality of magnetic detector elements located in an arc line around the upper open portion of the pneumatic bearing to output a signal, such that the magnetic detector elements are different in projected position on the axis of rotation of the sphere;

a nozzle for spraying pressurized air on a portion of the sphere rotatably supported in the pneumatic bearing, so that the magnetic detector elements detect passage of the magnetized point by the magnetic detector elements or between the magnetic detector elements an electrical circuit for obtaining the measurement values necessary for calculating the dynamic imbalance of the sphere based on the signal of the magnetic detector elements;

a retaining ring having an inner peripheral surface attached to the upper open portion of the pneumatic bearing, wherein the magnetic detector elements are comprised of a Hall element, respectively, and arranged in said arc line at equal intervals around the inner peripheral surface of the retaining ring, and the nozzle is located to face the sphere above the Hall element at a central position in the arc line.

* * * * *